United States Patent

Couch

[15] 3,668,423

[45] June 6, 1972

[54] LOGIC CIRCUIT DELAY SYSTEM COMPRISING MONOSTABLE MEANS FOR PROVIDING DIFFERENT TIME DELAYS FOR POSITIVE AND NEGATIVE TRANSITIONS

[72] Inventor: Francis O. Couch, Belmont, Calif.

[73] Assignee: GTE Automatic Electric Laboratories Incorporated, Northlake, Ill.

[22] Filed: Mar. 18, 1971

[21] Appl. No.: 125,670

[52] U.S. Cl. ....................307/208, 307/215, 307/262, 307/265, 307/269, 307/273, 307/289, 307/293, 328/60

[51] Int. Cl. ....................H03k 5/153

[58] Field of Search ....................307/208, 215, 236, 262, 265, 307/269, 273, 289, 293; 328/59–63

[56] References Cited

UNITED STATES PATENTS

| | | | |
|---|---|---|---|
| 3,504,200 | 3/1970 | Avellar | 307/265 X |
| 3,504,288 | 3/1970 | Ross | 307/273 X |
| 3,555,434 | 1/1971 | Sheen | 307/273 X |
| 3,578,988 | 5/1971 | Slowikowski | 307/273 X |
| 3,588,546 | 6/1971 | Lagemann | 307/208 X |

*Primary Examiner*—Stanley D. Miller, Jr.
*Attorney*—K. Mullerheim, Leonard R. Cool, Russell A. Cannon and Theodore C. Jay, Jr.

[57] ABSTRACT

A logic circuit having a single monostable circuit operating a flip-flop circuit and means controlled by the latter to switch resistance values in an RC circuit of the monostable for establishing different time delays for positive and negative logic transitions.

4 Claims, 1 Drawing Figure

PATENTED JUN 6 1972 3,668,423
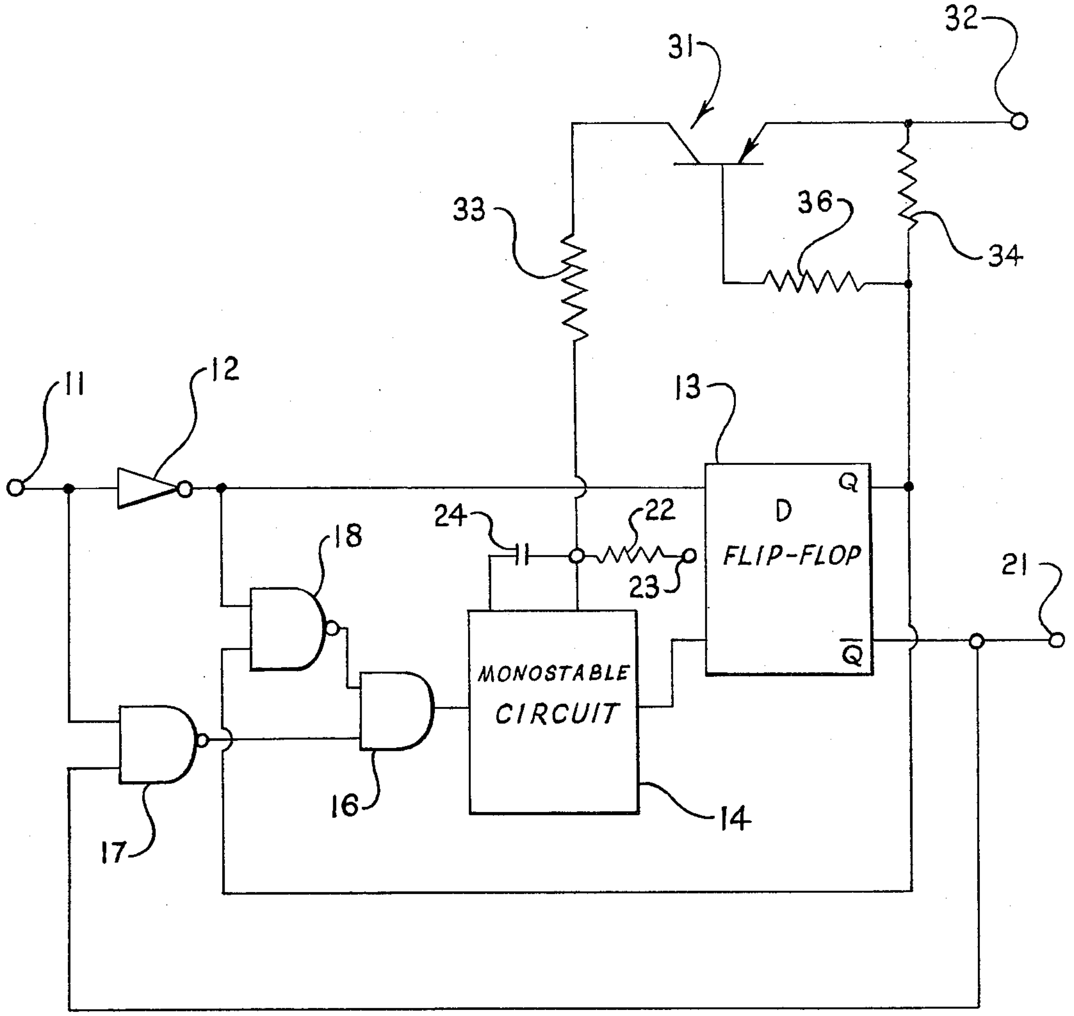
*INVENTOR.*
FRANCIS O. COUCH

LOGIC CIRCUIT DELAY SYSTEM COMPRISING MONOSTABLE MEANS FOR PROVIDING DIFFERENT TIME DELAYS FOR POSITIVE AND NEGATIVE TRANSITIONS

BACKGROUND OF INVENTION

It is recognized that in any sequential logic system the order of occurrence of events is quite as important as the occurrence of the events themselves. Thus for example if an event A must first occur and then an event B and then an event C, in order to produce a desired result or output, it is recognized that once A has occurred, C must not then occur before B. Should C occur first or be likely to occur first, two possibilities exist as to correction of this situation; either B can be advanced or speeded up or C can be slowed down. Generally it is easier, both technically and economically, to slow something down than it is to speed it up and thus the usual procedure in this instance would be to add a delay to the occurrence of the event C in order to ensure that the system will in fact operate properly.

The foregoing situation is directly applicable to telephone systems together with individual exchanges thereof. Thus, for example, transmission of on-hook and off-hook signals are preferably accomplished with some predetermined and different time delays in order to preclude possibilities of inadvertently generating regenerative signals causing some type of self-repeating cycle. Various other situations of this general nature are also encountered in telephone switching and trunking because of the comparatively long operate and release times of relays and the dependence of these times upon a variety of parameters including contact load, coil resistance, available voltage, and possibly capacitance and resistance of subscribers lines. These conditions and others are subject to variation such that certain events may inadvertently occur prior to their expected time of occurrence so as to become out of order in a logic sequence and thereby produce some different result from that intended by initiation of the sequence.

Although the general problems briefly discussed above are known in the art, attempts to overcome same are normally accompanied by an undesirable degree of circuit complexity. The present invention provides a particularly useful and simple circuit for generating different time delays for positive and negative logic transitions so as to be generally applicable in the field of time delay generation and particularly applicable in the field of telephone systems.

SUMMARY OF INVENTION

The present invention provides a relatively simple circuit generating a first time delay between the application of a logic one to the circuit and the subsequent appearance of same at the circuit output and generating a second and different time delay between the application of the logic zero between the input of the circuit and the appearance thereof at the output of the circuit.

The system of the present invention comprises but a single monostable circuit having an RC circuit establishing a normal time delay in which the circuit remains in unstable state. This monostable circuit is coupled to clock a flip-flop circuit also receiving the inverted input signal and producing an output comprising the output of the system. The flip-flop circuit is also connected to a switching circuit for operation by the flip-flop. This switching circuit effectively switches or varies the resistance in the RC circuit of the monostable circuit so as to cause a different width of output pulse from such circuit for different logic transitions. These pulses of predeterminable and different width are employed to clock the flip-flop circuit and thus to produce different time delays at the output of the system for positive and negative logic transitions applied to the system.

DESCRIPTION OF FIGURES

The present invention is illustrated as to preferred embodiments thereof in the accompanying drawing wherein the sole FIGURE is a circuit diagram of a logic circuit delay system in accordance with the present invention.

DESCRIPTION OF PREFERRED EMBODIMENTS

Referring to the drawing, there will be seen to be provided an input terminal 11 connected through an inverter 12 to one input of an integrated circuit bistable multivibrator or D type flip-flop, hereinafter termed DFF 13. The DFF is clocked by the output of a monostable circuit 14. The input of the monostable circuit 14 is obtained from an AND-circuit 16 having two inputs comprising the output of NAND-circuits 17 and 18. The NAND-unit 17 has one input connected to the input terminal 11 and one input connected to an output terminal 21 of the system. The other NAND-unit 18 has one input connected to the output of the inverter 12 and the other input connected to the reverse or opposite output of the DFF 13. DFF 13 has a Q- and $\overline{Q}$-output and the $\overline{Q}$-output is connected to the output terminal 21 of the system. The monostable circuit has an RC circuit indicated in the drawing as a resistor 22 having one end connected to a positive power supply terminal 23 and a capacitor 24. The resistor and capacitor are connected together at a junction 26 and both the junction and capacitor are then connected internally to the monostable circuitry.

Before proceeding further with a description of the general circuit of the present system, it is noted that monostable circuits are well known in the art. In the Electronics and Nucleonics Dictionary, Third Edition, McGraw-Hill Book Company, by John Marcus, a monostable circuit is defined at page 412 as "A circuit having only one stable condition, to which it returns in a predetermined time interval after being triggered." One example of a monostable circuit is a monostable multivibrator. It will be appreciated that the monostable circuit operates to normally maintain a stable state but upon receipt of a positive going input signal switches to an unstable state for a period of time determined by the time constant of resistor 22 and capacitor 24. The output of this circuit is normally a logic one in the stable state of the circuit and switches to a logic zero for some period of time following application of a positive going pulse to the input of the circuit. As previously noted, the time during which the output remains in the unstable or zero state is determined by the time constant of resistors 22 and capacitor 24. At the termination of this time, the output of the circuit reverts back to logic one which in this case might, for example, be 5 volts as contrasted to a zero voltage situation for logic zero output.

Referring further to the drawing there is additionally included in the system thereof a PNP-transistor 31 having the emitter thereof directly connected to a positive power supply terminal 32 and the collector connected through a resistor 33 to the junction point 26 in the RC circuit of the monostable circuit. The Q-output of the DFF 13 is connected through a first resistor 34 to this positive power supply terminal 32 and through a second resistor 36 to the base of the transistor 31. This last described circuit in fact can be considered to comprise a switching circuit for controllably varying the resistance in the RC circuit of the monostable circuit, as discussed in further detail below.

Before proceeding with the description of operation of the system illustrated in the drawing, it is noted that the particular circuitry illustrated is arranged in such form because it is easily implemented with commercially available components. It is, however, to be appreciated that the input to the monostable circuit may be implemented by an exclusive OR function. In this circumstance it is not necessary to employ an inverter 12 and the NAND-units 17 and 18 and AND-unit 16 may be replaced by an exclusive OR unit having one input thereof connected to the input terminal 11 and the other input connected to the $\overline{Q}$-output of the D flip-flop with the output of the system then being provided from the Q-output of the D flip-flop. Such a variation is straightforward substitution which will be understood by those skilled in the art. It is also to be noted that the system is illustrated with respect to positive logic, i.e., wherein logic "1" is a positive voltage. Should it be desired to operate the circuit on a negative logic the switching circuitry would be connected to the $\overline{Q}$-output of the D flip-flop with the output of the system then being provided by the Q-output of the D flip-flop.

Considering now operation of the system of the present invention and referring again to the drawing, first assume that power has been applied to the circuit and that the input is "-zero" and that the DFF has come up in the clear state meaning that the output at point 21 thereof is a "one." There will thus be applied as inputs to the NAND-unit 17 a "zero" input from terminal 11 and a "one" input from the $\overline{Q}$-output of DFF 13 so that a "one" output is applied from a NAND-unit 17 to the AND-unit 16. The NAND-unit 18 receives a "one" input from the inverter 12 and a "zero" input from the Q-output of DFF 13 so as to produce a "one" output applied as the other input to the AND-unit 16. With both inputs to the AND-unit 16 being "one" the output will be "one," which is then applied as the input to the monostable circuit. The output of the monostable circuit is also a "one" which is applied as the clock input to the DFF 13.

Assume now that the input at terminal 11 rises to a "one." Through the logic circuitry there will be applied as the input to the monostable circuit 14 a "zero" under this condition but inasmuch as this is a negative transition the monostable circuit does not trigger or change states and consequently no change in state or signal is applied to the clock input of the DFF 13 so that the output of the DFF at terminal 21 remains unchanged. Under this condition both input and output of the system are "one." It may be shown that if the DFF 13 originally produces an output "zero," i.e., the "set" state of this unit when power is originally applied to the circuit and the input comes up at "one" the input transition to "zero" will have no effect on the output and consequently the circuit is self-correcting.

Considering further the operation of the present invention as illustrated in the drawing, assume that the input to the circuit is a "zero" and the output is a "zero." This will apply two "zero" inputs to the NAND-unit 17 to produce a "one" output therefrom as one input to the AND-unit 16. The inverter 12 applies a "one" input to NAND-unit 18 and the other input thereof is a "one" as received from the Q output of the DFF 13. Thus the output of the NAND-unit 18 is a "zero" and with a "zero" and a "one" input to the AND-unit 16 the output thereof will be "zero" as the input of the monostable circuit 14. The emitter of transistor 31 is at a plus voltage, say +5 volts, and in this state the Q-output of the DFF 13 is high with the current into the base of the transistor 31 being limited by the resistor 36 so that the transistor 31 is non-conducting. Assume now that the input to the circuit terminal 11 goes to "one." This applies a "one" input to NAND-circuit 17 with the other input being "zero" so that the output remains "one" as one input to the AND-circuit 16. One input of the NAND-circuit 18 remains a "one" with the other input becoming a "-zero" so that the output of the NAND-circuit 18 becomes a "one" as the other input of the AND-circuit 16. Consequently the input to the monostable circuit goes to "one" which is a positive transition that triggers the monostable circuit. Thus the output of the monostable circuit goes to "zero" as the input to the DFF clock and remains in this condition for a time determined by the time constant of the combination of resistor 22 and capacitor 24. At the termination of this time the output of the monostable circuit reverts to a "one." The positive transition from "zero" to "one" at the clock input of the DFF 13 operates this unit so that the inverted input, i.e., a "zero" appears at the Q-output and consequently the circuit output or $\overline{Q}$ of the DFF becomes a "one." This change in the output of the system at terminal 21 from "zero" to "one" applies a "one" input to the lower input of the NAND-unit 17 so that the output thereof becomes a "zero" thus causing a "zero" input to the monostable circuit 14. Thus it will be seen that the output of the system has followed the input with a first delay determined by the time constant of resistor 22 and capacitor 24 connected to the monostable circuit 14.

In the foregoing condition wherein the output at terminal 21 of the system is a "one" it will be seen that the Q-output of the DFF 13 is a "zero" which then operates to pull the voltage of the transistor base more negative than the emitter. With appropriate choice of the values of resistors 34 and 36, transistor 31 conducts and in fact saturates so that the voltage at the collector of the transistor is equal to the voltage at terminal 32 minus the saturation voltage of the transistor itself. It is to be noted that the saturation voltage of the transistor is quite small as, for example, less than 0.2 volts and thus for most circuits may be ignored. This then means that the collector voltage is substantially equal to the positive voltage applied to terminal 32. Consequently it may be considered that resistors 22 and 33 are in fact in parallel inasmuch as the terminal 23 and the voltage of the collector of transistor 31 are substantially equal. This parallel resistance $R_p$ which is equal to $R_{23}R_{33}/(R_{22}+R_{33})$ is then effectively in circuit with the capacitor 24 to determine the time constant of the monostable circuit.

Consider now the situation wherein the signal at the input terminal 11 of the system goes from "one" to "zero." This will produce a "one" input to the monostable circuit which produces triggering of the monostable circuit so that the output thereof becomes "zero" for some time determined by the capacitance 24 and resistance $R_p$ (defined above). Consequently the clock input of the DFF 13 drops to "zero" for this second time delay. The DFF 13 operates after this time delay upon a positive transition from the "zero" clock input to a "one" clock input so that the output of the DFF 13 drops to "zero." This then causes the input to the monostable circuit 14 to drop to "zero," as described above. Consequently it will be seen that the output at terminal 21 follows the input with the delay of the second time delay. From the foregoing it will be appreciated that a positive transition, i.e., from logic "-zero" to a logic "one," produces an output signal from the system of "one" after a first time delay. A negative transition from logic "one" to logic "zero" produces a "zero" output from the system of the present invention after a second time delay. The circuit of the present invention automatically resets itself so that the foregoing transitions always produce the same results with the same time delays. It is, however, to be appreciated that by appropriate choice of the values of capacitor 24 and resistor 22 various delays can be selected. Should it be desired for the relationship of the time delays to be reversed, it is only necessary to reverse the connections of the Q- and $\overline{Q}$-outputs of the D flip-flop 13. It is also to be noted that the circuitry illustrated in the figure assumes a positive logic circuitry so that a logic "zero" is toward ground. Should it be desired to employ negative logic, reversing of Q- and $\overline{Q}$-connections of DFF 13 are required and a NPN-transistor would be employed rather than the PNP-transistor 31.

The present invention has been described in connection with a single preferred embodiment thereof; however, it is to be appreciated that variations in the circuitry are possible. It will be further noted that the present invention requires but a single monostable circuit to accomplish the establishment of different time delays in production of opposite logic transitions and this is highly desirable in savings and cost and complexity of circuitry. It is not intended to limit the present invention by the details of illustration nor the particular terms of description employed.

What is claimed is:

1. A logic circuit delay system comprising:

an input and an output terminal, a D-type flip-flop circuit having signal and clock inputs and first and second complimentary outputs with the first output connected to said output terminal, a monostable circuit having an input and an output with the output connected to the clock input of said flip-flop circuit, said monostable circuit including an RC circuit establishing a time delay in which the monostable circuit remains in unstable state, logic means applying to the input of said monostable circuit a signal that is a function of the signals at said input and output terminals to thus clock said flip-flop and applying a function of the signal at the input terminal to the flip-flop input, and switching means operated by the logic signal at the second output of said flip-flop circuit for changing the effective value of the resistance in the RC circuit of said monostable circuit to thus alter the time constant of such circuit, whereby the logic signal at said output follows the logic signal at said input terminal with a different time delay for opposite logic signal transitions.

2. The system of claim 1 further defined by said RC circuit including a series connected first resistance and capacitance with the first resistance connected to a power supply terminal, and said switching means comprising a transistor controlled by the signal at the second flip-flop output terminal and connected between a power supply terminal and a second resistor in turn connected to the juncture of said capacitance and first resistance whereby conduction of said transistor effectively switches the resistance value in said RC circuit.

3. The system of claim 1 further defined by said logic means comprising a first NAND unit having the two inputs separately connected to said input and output terminals, an inverter connected between said input terminal and the flip-flop input, a second NAND unit having one input connected to the output of said inverter and another input connected to the second output of said flip-flop circuit, and an AND unit having two inputs connected one to the output of each of said NAND units and an output connected to the input of said monostable circuit.

4. A logic circuit delay system comprising, an input terminal adapted to receive logic signals and an output terminal, one monostable circuit having a stable state with a first output signal and an unstable state with a second output signal and changing from stable to unstable state upon receipt of a logic transition from "one" to "zero," said monostable circuit including a series RC circuit with a time constant establishing the time duration of the monostable circuit in the unstable state, a D-type integrated circuit flip-flop having an input, a clock input and first and second complimentary outputs, said clock input being connected to the output of said monostable circuit for operating the flip-flop upon receipt of a change from second to first outputs thereof, said first output being connected to said output terminal, logic circuitry applying a function of signals at said input terminal to the input of said flip-flop and applying a function of the signals at said input and output terminals to the input of said monostable circuit, and switching means operated by the signal at the second flip-flop output for connecting and disconnecting a second resistance in the RC circuit of said monostable circuit for varying the duration of second output signal from said monostable circuit whereby the logic signals at the output terminal follow logic signals at the input terminals at different time delays depending upon the direction of logic signal transition.

* * * * *